Patented Sept. 26, 1950

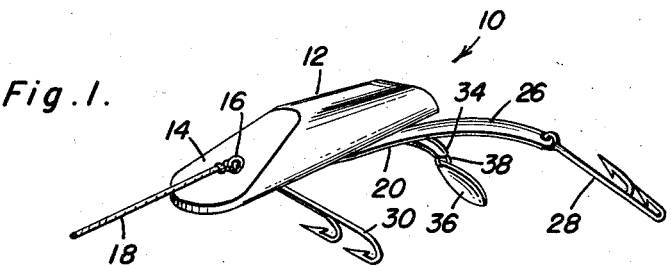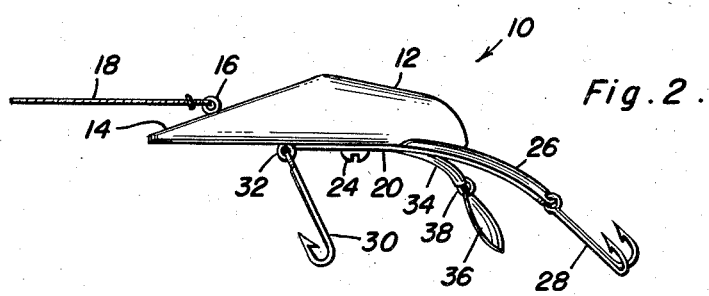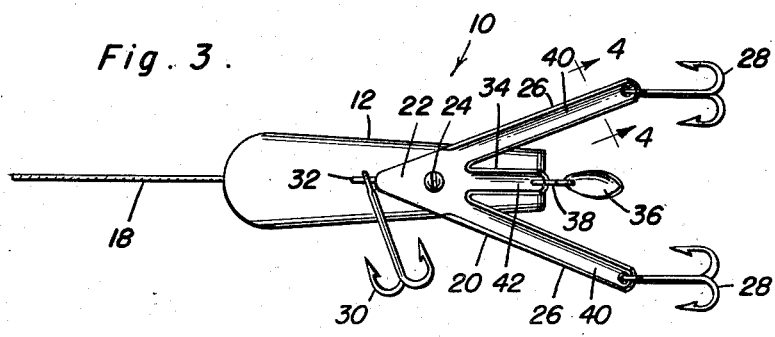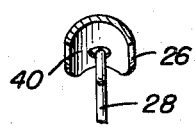
Inventor
Jacob I. Koski

2,523,831

UNITED STATES PATENT OFFICE 2,523,831

FISHING LURE

Jacob I. Koski, Ashtabula, Ohio

Application April 15, 1949, Serial No. 87,708

3 Claims. (Cl. 43—42.28)

This invention relates to new and useful improvements and structural refinements in fishing lures, and the principal object of the invention is to simulate the appearance and movement of a frog.

This object is achieved by the provision of a lure consisting of a "frog" shaped body having an appendage secured to the underside thereof, the appendage assuming the form of a substantially V-shaped member which is attached to the body in such manner that the limbs of the member resemble rear legs of a frog.

An important feature of the invention lies in the provision of a plurality of fish hooks on the V-shaped member, one of these fish hooks being so disposed as to simulate the frog's front legs.

Another feature of the invention resides in the formation of grooves or channels on the undersurface of the limbs of the V-shaped member, which grooves or channels offer resistance to water when the lure is placed in use and thereby cause the lure to travel with a life-like movement.

Some of the advantages of the invention lie in its simple construction and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention;

Figure 2 is a side elevational view thereof;

Figure 3 is an underside plan view of the same, and;

Figure 4 is a cross sectional detail, taken substantially on the plane of the line 4—4 in Figure 3.

Like characters of reference are employed to designate like parts in the specification and throughout the several views.

Referring now to the accompanying drawings in detail, the invention consists of a fishing lure designated generally by the reference character 10, the same embodying in its construction a "frog" shaped body 12 having a flattened tapered nose portion 14 provided with an eye 16 whereby the entire lure may be suitably attached to a fishing line 18, as will be clearly apparent.

An appendage assuming the form of a substantially V-shaped member 20 is rigidly secured at the apex portion 22 thereof to the undersurface of the body 12 by a suitable screw 24, the member 20 providing a pair of rearwardly divergent and downwardly arcuated limbs 26, as will be clearly apparent.

The rear end portions of the limbs 26 are formed with apertures to receive suitable fish hooks 28 of the "gang" type, while a similar fish hook 30 is attached to the apex portion 22 of the member 20 by an eye 32.

Needless to say, the hooks 28, 30 are movably attached to the member 20, and it will be observed that the limbs 26 of the member 20 resemble the rear legs of a frog while the fish hook 30 itself simulates the appearance of the front legs, as is best shown in Figures 1 and 2. Moreover, the appearance of the body 12 is such as to co-act with the appendage in simulating the appearance of a frog, substantially as shown.

A downwardly arcuated tongue 34 is formed integrally with the apex portion 22 of the member 20 and extends rearwardly therefrom between the limbs 26, a suitable spoon 36 being movably attached to the rear end portion of the tongue, such as for example, by an eye or link 38.

The limbs 26 as well as the tongue 34 are provided on the undersurface thereof with longitudinally extending grooves or channels 40, 42 respectively (see Figure 3), so that when the lure is drawn through water, these grooves or channels will offer resistance to the water stream and cause the lure to exhibit life-like motion. If desired, the grooves or channels 40, 42 may be provided by forming the limbs 26 and the tongue 34 into a convexo-concave cross sectional configuration, as illustrated in Figure 4.

Needless to say, the life-like movement of the lure results not only from the provision of the channels 40, 42, but also from the downward arcuation of the limbs 26 and tongue 34, as described.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a fishing lure, the combination of a body, an appendage comprising a substantially V-shaped member secured at the apex thereof to the underside of said body and providing a pair of rearwardly divergent limbs, said limbs being provided on the underside thereof with longitudinally extending channels, and a fish hook movably attached to the rear portion of each limb.

2. A fish lure comprising an elongated body adapted at the front end portion thereof for attachment to a fishing line, a substantially V-shaped member secured at the apex portion thereof to the underside of said body and providing a pair of rearwardly divergent and downwardly arcuate limbs provided on the underside thereof with longitudinally extending channels, fish hooks movably attached to said apex portion and to the rear ends of said limbs, a downwardly arcuated tongue formed integrally with said apex portion and extending rearwardly therefrom between said limbs, and a spoon movably attached to the rear end of said tongue.

3. The device as defined in claim 2 wherein said tongue is provided on the undersurface thereof with a longitudinal channel.

JACOB I. KOSKI.

REFERENCES CITED

The following references are of record in the file of this patent:

UNITED STATES PATENTS

| Number | Name | Date |
| --- | --- | --- |
| D. 152,657 | Simon | Feb. 8, 1949 |
| 2,069,724 | Pflueger | Feb. 2, 1937 |